J. SAPORIT & J. VICENTIN.
RESILIENT WHEEL.
APPLICATION FILED MAY 20, 1914.
1,187,557.
Patented June 20, 1916.
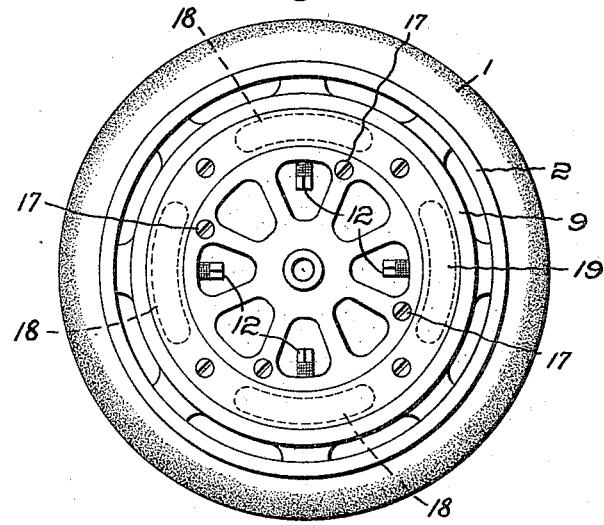
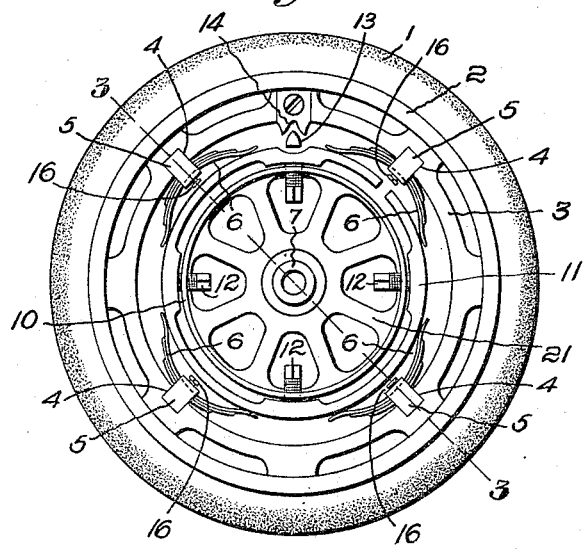 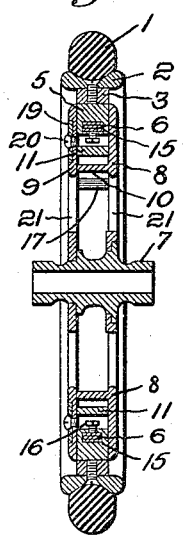
Witnesses:
Horace A. Crossman
Carl L. Choate
Inventors:
John Saporit.
John Vicentin.
by Emery, Booth, Janney & Varney
Attys

UNITED STATES PATENT OFFICE.

JOHN SAPORIT, OF EVERETT, AND JOHN VICENTIN, OF CAMBRIDGE, MASSACHUSETTS.

RESILIENT WHEEL.

1,187,557.

Specification of Letters Patent. Patented June 20, 1916.

Application filed May 20, 1914. Serial No. 839,884.

*To all whom it may concern:*

Be it known that we, JOHN SAPORIT and JOHN VICENTIN, both citizens of the United States, and residents of Everett and Cambridge, respectively, county of Middlesex, and Commonwealth of Massachusetts, (whose post-office addresses are, respectively, 23 Avon street, Everett, Massachusetts, and 77 Main street, Cambridge, Massachusetts,) have invented an Improvement in Resilient Wheels, of which the following description, in connection with the accompanying drawings, is a specification, like characters on the drawings representing like parts.

This invention relates to an improvement in resilient wheels.

In the drawings: Figure 1 is a side elevation of our invention. Fig. 2 is a similar view with some of the parts removed. Fig. 3 is a cross-section taken on the line 3—3 of Fig. 2.

The particular illustration of our resilient wheel which we have shown in the accompanying drawings is provided with a solid rubber tire 1, which is supported upon a grooved rim 2 in any usual manner. Solidly attached to the inside periphery of said rim 2, is a ring 3 provided at various equidistant points on its inside periphery with squared recesses 4, wherein are nested blocks 5 which hold leaf springs 6. In the drawings we have shown four such sets of blocks and springs, but it is obvious that this number may be increased or diminished as the necessities of a particular application may require. In the particular illustration shown herein, we have shown the blocks 5 as provided with squared openings 15 wherein the leaf springs 6 are held by means of set screws 16.

Integral with the hub 7 is a disk shaped portion 8 which lies in a plane perpendicular to the axis of the wheel and which is of a sufficient diameter to cover a part of one side of the ring 3. A similar disk shaped part 9 surrounds the hub on the other side of the wheel and is of substantially the same diameter as the disk 8. This disk 9 is removably attached to its companion disk 8 by means of securing elements 17 and when so attached makes with the disk 8, a complete inclosure for the springs 6, and the expansion ring 11, and so securely holds the ring 3 and its connected parts to the rest of the wheel. The ring 3 however is not tightly pinched between the inside faces of the disks 8 and 9 but is allowed sufficient room to allow radial and circumferential movement as permitted by the springs 6 and the post 13. We have shown the disk 9 provided with openings 18 in order that the internal parts of the wheel may be conveniently reached; and these openings are covered under ordinary circumstances with a plate 19, which may be attached to the disk 9 by means of screws 20 or other similar means. Of course any ordinary suitable covering device or devices may be applied for this purpose without departing from the spirit of our invention, and the disk 8 may also be provided with openings similar to those shown in disk 9.

In the drawings we have shown the central portions of the disks 8 and 9, next to the hub 7 formed in the shape of spokes 21; but of course any form of connection between the peripheral portion of the disk 8 and the hub may be provided.

Made integral with the disk 8 is the ring 10 which is concentric with the periphery of the ring 3 and upon whose outside periphery rests a circular expansion ring 11 made adjustably expandible by means of threaded bolts 12, which pass through the ring 10 at convenient points and impinge against the inner periphery of said expansion ring. The free ends of the leaf springs 6 hereinbefore described bear against the outside periphery of the expansion ring 11.

Made integral with the disk 8 is a triangular post 13 adapted to engage the sides of a notch 14, provided at the inside periphery of the ring 3 in order to prevent any considerable rotation of the ring 3 and the parts connected therewith relatively to the hub 7 and its various connected parts. Of course it is obvious that any desired number of such posts 13 and the corresponding notches 14 may be provided as the particular circumstances of a given application might make advisable.

Having now described the details of one specific illustrative form of our invention, we shall describe its mode of operation. As the hub 7 is subjected to the weight of the vehicle to which the wheel is attached, there is a tendency for the parts connected with the hub to move toward the lower part of ring 3. This tendency is yieldingly arrested by the springs 6 which are interposed between the expansion ring 11 and the ring

3. The companion disks 8 and 9 being held apart a given distance by the thickness of the ring 10, this distance being somewhat greater than the width of the ring 3, motion of the ring 3 relatively to the hub 7 and its connected parts is allowed. The notch 14 in the ring 3 is sufficiently deep and sufficiently wide to permit of the free relative movement of the hub 7 and its connected parts relatively to the ring 3 and still to provide for the impingement of the post 13 against one or the other of the sides of the notch 14, in order to transmit rotary movement from the hub 7 and its connected parts to the ring 3 and its connected parts.

Of course we may provide a pneumatic tire instead of the solid rubber tire 1, without departing from the spirit of our invention.

We have found it most practicable in practice to construct all of the parts hereinbefore described except the tire, of metal; but of course it may become expedient in view of the requirements of some particular application of our invention to use other materials in its construction, and we do not wish to limit ourselves to the use merely of metal in the practice of our invention.

What we claim is:

1. In a wheel, a rim, a ring connected to the inner periphery thereof provided with a recess adapted to be engaged by a corresponding projection, and provided with recesses for holding spring supporting means, spring supporting means nested in said recesses, curved free-ended leaf springs held by said spring supporting means so arranged that the concavities of the springs lie toward the hub, and so that whatever may be the pressure exerted upon said springs the outward movement of their ends is unrestricted, a hub, a disk shaped plate attached thereto and bearing a projection adapted to register with said first named recess in said ring, a collar made integral with said disk shaped plate, an expansion ring surrounding and adjustably supported upon said collar, and adjusting screws perforating said collar and supporting said expansion ring, upon which ring bear the free ends of said springs.

2. In a wheel, a rim, a hub, and means connecting the hub and rim including a disk shaped plate attached to the hub and provided with a collar integral therewith, an expansion ring adjustably mounted upon said collar, leaf springs bearing upon said ring held in spring retaining blocks, blocks for retaining said springs, and a ring attached to the rim provided with openings wherein said blocks are nested.

3. In a wheel, a rim 2, a hub 7, and means connecting said rim and hub including curved leaf springs 6 having their concavities facing the hub of the wheel, spring-retaining blocks 5 set in said rim, and an expansion ring 11 upon which the free ends of said springs bear and which is adapted to be radially adjusted to modify the action of said springs.

In testimony whereof, we have signed our names to this specification, in the presence of two subscribing witnesses.

JOHN SAPORIT.
JOHN VICENTIN.

Witnesses:
F. IRENE CHANDLER,
ROBERT H. KAMMLER.

Copies of this patent may be obtained for five cents each, by addressing the "Commissioner of Patents, Washington, D. C."